United States Patent
Luneau et al.

(10) Patent No.: US 7,418,087 B2
(45) Date of Patent: Aug. 26, 2008

(54) TELEPHONE NETWORK MESSAGING

(75) Inventors: David J. Luneau, Concord, NH (US);
Ray F. Chadwick, Bedford, NH (US)

(73) Assignee: ClassCo Inc., Concord, NH (US)

( * ) Notice: Subject to any disclaimer, the term of this patent is extended or adjusted under 35 U.S.C. 154(b) by 971 days.

(21) Appl. No.: 10/038,866

(22) Filed: Jan. 4, 2002

(65) Prior Publication Data

US 2003/0128821 A1 Jul. 10, 2003

(51) Int. Cl.
H04M 1/64 (2006.01)
(52) U.S. Cl. .............................. 379/88.21; 379/211.04; 340/539.1; 340/825.52
(58) Field of Classification Search .............. 379/88.19, 379/40, 88.04, 45, 88.2, 88.21, 127.01, 142.04, 379/207.15, 142.01, 211.04; 340/539.1, 340/825.52
See application file for complete search history.

(56) References Cited

U.S. PATENT DOCUMENTS

| | | | |
|---|---|---|---|
| 4,656,652 A | 4/1987 | Nagai | 379/41 |
| 5,029,290 A | 7/1991 | Parsons et al. | 340/533 |
| 5,121,430 A | 6/1992 | Ganzer et al. | 380/48 |
| 5,265,145 A | 11/1993 | Lim | |
| 5,394,461 A | 2/1995 | Garland | 379/106 |
| 5,434,906 A | 7/1995 | Robinson et al. | 379/67 |
| 5,509,054 A | 4/1996 | Garland | 379/106 |
| 5,541,980 A | 7/1996 | Urewicz | 379/61 |
| 5,761,312 A | 6/1998 | Zelikovitz, et al. | 380/49 |
| 5,875,232 A * | 2/1999 | Wolf | 379/88.19 |
| 5,905,774 A * | 5/1999 | Tatchell et al. | 379/88.04 |
| 5,949,851 A | 9/1999 | Mahaffey | 379/48 |
| 5,966,651 A * | 10/1999 | Sibecas | 379/88.19 |
| 6,002,748 A | 12/1999 | Leichner | 379/48 |
| 6,021,177 A | 2/2000 | Allport | 379/48 |
| 6,067,349 A * | 5/2000 | Suder et al. | 379/88.19 |
| 6,072,859 A * | 6/2000 | Kong | 379/88.19 |

(Continued)

OTHER PUBLICATIONS

Page Update, "Weather Alert 2000, The Next Generation of Severe Weather Notification", undated.

(Continued)

*Primary Examiner*—Gerald Gauthier
(74) *Attorney, Agent, or Firm*—Fish & Richardson P.C.

(57) ABSTRACT

In a messaging system, a messaging server transmits signals over the telephone network to be received by equipment at, e.g., the customer premises. The receiving equipment converts the signals into meaningful information (e.g., written or audible words, audible tones, and/or lights), and provides that information (e.g., by audible announcement and/or visual display) to the user. The signals can be of a variety of types. For example, the signal can be the Incoming Caller Line Identification (ICLID) signal associated with an incoming telephone call. Alternatively, the ICLID signal can be can be sent with the set-up of a non-associated telephone call, and can correspond to a message code, such as to provide the recipient with notification information such as emergency notification messages. Such notification information can be substantially simultaneously transmitted to a number of sets of receiving equipment (e.g., all homes in a given region). The notification information need not be transmitted alongside an incoming telephone call, and can be received regardless of whether the telephone equipment at the customer premises is on- or off-hook. The receiving equipment can display and/or announce the information, e.g., in the user's preferred language.

22 Claims, 7 Drawing Sheets

U.S. PATENT DOCUMENTS

| | | | |
|---|---|---|---|
| 6,078,646 A | 6/2000 | McLaughlin et al. | |
| 6,160,876 A * | 12/2000 | Moss et al. | 379/88.19 |
| 6,201,856 B1 * | 3/2001 | Orwick et al. | 379/40 |
| 6,233,325 B1 * | 5/2001 | Frech et al. | 379/142.06 |
| 6,233,430 B1 | 5/2001 | Helferich | 455/31.1 |
| 6,243,442 B1 | 6/2001 | Tanaka et al. | 379/45 |
| 6,246,752 B1 | 6/2001 | Bscheider et al. | 379/88.22 |
| 6,249,570 B1 | 6/2001 | Glowny et al. | 379/88.22 |
| 6,249,579 B1 | 6/2001 | Bushnell | 379/356 |
| 6,252,946 B1 | 6/2001 | Glowny et al. | 379/88.22 |
| 6,252,947 B1 | 6/2001 | Bushnell | 379/88.22 |
| 6,252,952 B1 | 6/2001 | Kung et al. | 379/114 |
| 6,253,061 B1 | 6/2001 | Helferich | 455/31.2 |
| 6,259,692 B1 | 7/2001 | Shtivelman et al. | 370/352 |
| 6,259,892 B1 | 7/2001 | Helferich | 455/31.3 |
| 6,266,340 B1 | 7/2001 | Pickett et al. | 370/442 |
| 6,266,341 B1 | 7/2001 | Surprenant et al. | 370/458 |
| 6,272,212 B1 | 8/2001 | Wulforst et al. | 379/199 |
| 6,285,364 B1 | 9/2001 | Giordano, III et al. | 345/347 |
| 6,289,025 B1 | 9/2001 | Pang et al. | 370/261 |
| 6,289,084 B1 | 9/2001 | Bushnell | 379/67.1 |
| 6,289,094 B1 | 9/2001 | Miloslavsky | 379/220 |
| 6,292,482 B2 | 9/2001 | Pickett | 370/352 |
| 6,292,901 B1 | 9/2001 | Lys et al. | 713/300 |
| 6,295,348 B1 | 9/2001 | Bleile et al. | |
| 6,295,455 B1 | 9/2001 | Fischer et al. | 455/456 |
| 6,298,045 B1 | 10/2001 | Pang et al. | 370/261 |
| 6,301,480 B1 | 10/2001 | Kennedy, III et al. | 455/445 |
| 6,304,580 B1 | 10/2001 | Christie et al. | 370/467 |
| 6,310,944 B1 | 10/2001 | Brisebois et al. | 379/142.01 |
| 6,320,947 B1 | 11/2001 | Joyce et al. | 379/144 |
| 6,324,279 B1 | 11/2001 | Kalmanek, Jr. et al. | 379/229 |
| 6,327,342 B1 | 12/2001 | Mobley et al. | 379/45 |
| 6,327,343 B1 | 12/2001 | Epstein et al. | 379/88.01 |
| 6,327,359 B1 | 12/2001 | Kang et al. | 379/221.08 |
| 6,327,570 B1 | 12/2001 | Stevens | 705/7 |
| 6,330,010 B1 | 12/2001 | Nason et al. | 345/802 |
| 6,332,021 B2 | 12/2001 | Latter et al. | 379/142.01 |
| 6,332,085 B1 | 12/2001 | Hanson et al. | 455/557 |
| 6,337,717 B1 | 1/2002 | Nason et al. | 348/567 |
| 6,340,868 B1 | 1/2002 | Lys et al. | 315/185 S |
| 6,343,074 B1 | 1/2002 | Pickett | 370/353 |
| 6,343,120 B1 | 1/2002 | Rhodes | 379/142 |
| 6,345,260 B1 | 2/2002 | Cummings, Jr. et al. | 705/8 |
| 6,346,890 B1 * | 2/2002 | Bellin | 340/825.52 |
| 6,356,554 B1 | 3/2002 | Pickett et al. | 370/402 |
| 6,359,970 B1 | 3/2002 | Burgess | 379/67.1 |
| 6,363,346 B1 | 3/2002 | Walters | 704/231 |
| 6,363,411 B1 | 3/2002 | Dugan et al. | 709/202 |
| 6,366,578 B1 | 4/2002 | Johnson | 370/353 |
| 6,370,235 B1 | 4/2002 | Heiner | 379/67.1 |
| 6,370,523 B1 | 4/2002 | Anderson | 707/3 |
| 6,373,817 B1 | 4/2002 | Kung et al. | 370/217 |
| 6,374,078 B1 | 4/2002 | Williams et al. | 455/7 |
| 6,374,102 B1 | 4/2002 | Brachman et al. | 455/422 |
| 6,381,316 B2 | 4/2002 | Joyce et al. | 379/114.2 |
| 6,381,324 B1 | 4/2002 | Shaffer et al. | 379/211.02 |
| 6,456,694 B1 | 9/2002 | Posthuma | |
| 6,509,833 B2 * | 1/2003 | Tate | 340/539.1 |
| 6,567,502 B2 * | 5/2003 | Zellner et al. | 379/45 |
| 6,584,148 B1 | 6/2003 | Zitting et al. | |
| 6,643,266 B1 | 11/2003 | Pugaczewski | |
| 6,697,478 B1 * | 2/2004 | Meldrum et al. | 379/211.04 |
| 6,744,867 B1 | 6/2004 | Chin et al. | |
| 6,807,259 B1 * | 10/2004 | Patel et al. | 379/142.01 |
| 2003/0147518 A1 * | 8/2003 | Albal et al. | 379/207.15 |
| 2004/0100648 A1 | 5/2004 | Kulakowski | |

OTHER PUBLICATIONS

Bell Phones by Northwestern Bell Phones, "The Weatherphone", undated.

Consumer Electronics Daily News, "Northwestern Bell, Roosternet to Deliver E-mail Notification Via Caller ID", Jan. 9, 2002, p. 6.

RoosterNet, Inc., "Bridging the gap between the off-line and on-line".

Dialogic Communications Corp., "Kentucky Adds Speed, Accuracy to Emergency Communications with Ten-County Implementation of The Communicator!", Mar. 9, 2001.

Monitor wire reports News in Brief, "Pages to alert hearing impaired to storms", Jul. 3, 2001.

Cringely, "Wakeup Call In This Wired World, We Can Tell People Pretty Much Anything Except That There is a Cloud of Poison Gas Blowing Their Way", May 3, 2001, http://www.pbs.org/cringely/pulpit/pulpit20010503.html.

Aubry, "Storm alerts coming soon by E-mail, cell", Montrealgazette.com, Aug. 21, 2001.

Community Alert Network, Inc., "The Toolbox", undated.

Police News, "Reverse 911 and Guardian Calling", http://www.roselle.il.us/Police_News.htm, undated.

Lynch, "Officials, public alerted to value of Reverse 911", Chicago Tribune, Oct. 31, 2001, http://pqasb.pqarchiver.com/chicagotribune/main/abstract.html (Abstract).

Sigma Micro Corporation, "Reverse911.net Mutual Aid Notification Network Now Available to R911 Users", May 7, 2001, http://www.sigma-micro.com/Sigma_PR2.htm.

Sigma Micro Corporation, "Visionary Applications. Superior Service", http://www.sigma-micro.com/Company.htm (2001).

Sigma Micro Corporation, "Size Doesn't Matter", http://www.sigma-micro.com/ClientList.htm (2001).

Direct Alert America, "A National Emergency Warning Service for the 21st Century", www.directalertamerica.com, undated.

Allport Group, "Community Notification using patented Allport Methodology", www.AllportGroup.com (2001).

Popular Science, "What's New", May 2001, p. 17.

BellSouth, "BellSouth Government Emergency Telecommunications Service (GETS)", http://interconnection.bellsouth.com/products/vertical/gets/html, undated.

iBlast, "iBlast to Begin Pilot Test of Datacasting Industry's First-Ever Emergency Alert Service", Mar. 12, 2001, http://www.iblast.com/press.php3?aid=31.

International Search Report, Apr. 4, 2003.

Garland et al., "Application Notes, Proactive Loop Maintenance via Intelligent Pathway Application Example: Customer Premise Loop Test Interface Capability", Lucent Technologies, Inc., Issue 0.3, Nov. 24, 1998.

Press Release, "Turnstone's New T100 TDR Card Enables Remote, Long-Reach TDR Testing Without Truck Rolls", Source: Turnstone Systems, Inc., Jun. 5, 2001.

Dunford et al., Consultronics, "xDSL Service Testing A White Paper for Telecommunications and Internet Service Providers".

Turnstone, "Accelerate Residential DSL Deployment: Loop Management throughout the DSL Lifecycle, White Paper".

Bellcore, "LSSGR: Voiceband Data Transmission Interface, Section 6.6" GR-30-CORE, Issue 1, Dec. 1994.

Bellcore, "Customer Premises Equipment Compatibility Considerations for the Analog Display Services Interface" Special Report, SR-INS-002461, Issue 1, Dec. 1992.

VoiceAnnounce® 9900CW, Talking Caller ID, Users Guide, Rev. 3ES 0408DL, 2004.

* cited by examiner

4

US 7,418,087 B2

TELEPHONE NETWORK MESSAGING

FIELD OF THE INVENTION

The invention relates to a messaging system for receiving, interpreting, and acknowledging public safety, caller ID and/or other messaging information signals over the telephone network.

BACKGROUND

Changes in the North American telephone network have opened the door to new services available to business and residential customers. In particular, CLASS (Caller ID, Return Call, Call Block, Repeat Call, Priority Call, and Select Forward) services have been made possible, in part, by the deployment of a common channel interoffice signaling system called SS7, as well as advanced equipment at the telephone central office that can send data signals to end-user Customer Premises Equipment (CPE). Analogous systems are also being built, upgraded, or improved within wireless telephone networks and other paging and telecommunications systems. These signaling systems bring information about the call to points in the telephone network not previously available. For example, the identity of the calling party is made available, electronically, to the called party.

The Caller ID feature particularly promises a series of novel and useful benefits to the telephone subscriber. The telephone number of the calling party is made available such that it can be presented to the called party. Data representing the calling party number is transmitted in association with the telephone call and before the called party has answered. The called party can use the information to make a decision whether of not to answer the telephone or how it is to be answered.

To date, the majority of devices used to receive and interpret the data containing the calling party's number make use of some sort of visual display to convey the information to the user. Some devices do not display the data but make it available in a form that can be accepted by a personal computer.

In U.S. Pat. No. 4,582,956, issued Apr. 15, 1986 to Carolyn A. Doughty, a method is disclosed to display special information about a call, such as the calling party's telephone number. The method does not provide means for vocalized announcement of the number or association with any other information about the caller.

In U.S. Pat. No. 4,924,496, issued May 8, 1990 to Romek Figa, an incoming call number display is described that permits the called party to view the name or number of the caller. Although the invention provides means to associate the caller's number with a name, it does not provide means for vocalized announcement.

In U.S. Pat. No. 5,054,055, issued Oct. 1, 1991 to John P. Hanle, a system is disclosed to pass the calling party's number sent by the telephone office to a computer system. While common hardware and software components are available to announce the caller's identity, provision is not made for announcement over the answered telephone set, nor is it an object of such to implement a call announcement apparatus.

In U.S. Pat. No. 4,720,848, issued Jan. 19, 1988 to Tadahiko Akiyama, a system is disclosed to render information about an incoming call. While vocalized announcement is achieved over the telephone set, a special telephone office switch or private branch exchange (PBX) is necessary.

Similar implementations are cited in U.S. Pat. No. 4,899,358, issued Feb. 6, 1990, and U.S. Pat. No. 5,007,076, issued Apr. 9, 1991, both to James R. Blakely. Such implementations provide all vocalized announcement means via apparatus located at the telephone office switch or PBX, and are not designed as small business or residential premise equipment on trunks provisioned with the Caller ID or other enhanced data service features.

A variety of systems do not utilize the Caller ID or other enhanced data service features, but instead screen incoming calls by querying the caller for a name or number after the telephone connection has been established. U.S. Pat. No. 4,304,968, issued Dec. 8, 1981 to Klausner et al., discloses such an apparatus that answers the incoming telephone call and directs the caller to enter his or her telephone number using the telephone set tone keypad. Next, the device performs a search through a database of callers before ringing the premise extensions and announcing the caller's name. Such a device not only requires cooperation from the calling party to enter the telephone number but may result in a billed toll call since the call has actually been answered.

SUMMARY OF THE INVENTION

One aspect of the present invention concerns a data communication method for use in a telephone network having a caller-identification feature, wherein the caller-identification feature communicates data to a called party that includes data corresponding to a telephone number of a calling party. Such a network is the North American telephone network, which includes the "Caller ID" caller-identification feature, where the data communicated to the called party is the Incoming Caller Line Identification (ICLID) signal.

In this aspect of the invention, a message recipient having a telephone number on the telephone network is identified, and a message for that recipient selected. A message code corresponding to the selected message is provided, wherein the message code is in the format of a telephone number, e.g., a ten-digit number in the format (xxx) xxx-xxxx. A non-associated telephone call is then set up to the recipient telephone number from a simulated calling party having the same telephone number as the message code, such that the telephone network uses the caller-identification feature to communicate data corresponding to the message code to the recipient telephone number. The data corresponding to the message code is received at the recipient telephone number.

The term "non-associated telephone call" means a simulated telephone call from a simulated calling party (having the same telephone number as the message code) to the real recipient telephone number. In the non-associated telephone call, the caller-identification information for the simulated calling party is communicated (e.g., using SS7) to the recipient telephone number, but no actual call is provisioned.

This aspect of the invention allows for data communication using the caller-identification feature. Because data is communicated by setting up a non-associated telephone call that does not require provisioning an actual call, this method consumes little or no call bandwidth on the telephone network. For instance, in the North American telephone network, ICLID data is communicated on SS7, a portion of the network that is not presently used to transmit any voice traffic. This technique is particularly advantageous in that it puts minimal resource demands on the circuit-switched telephone network, and does not require expensive deployments of servers to each Central Office served.

This aspect of the invention allows messages other than Caller ID information (e.g., the name of the calling party, their telephone number, and/or their state) to be communicated to one or many recipients, selected, e.g., on the basis of geographical location. For instance, notification information, such as community notification and/or emergency messages, can be communicated to numerous households connected the telephone network. The information is presented without requiring the recipient to answer the telephone, and can be received while the phone line is not in use ("on-hook") or in use ("off-hook").

Unlike radios, televisions, and computers, telephone equipment is generally always in a state where it is ready to receive information. Moreover, telephones and telephone services are ubiquitous; nearly every home in the country is provisioned with telephone service. Thus, a notification message, such as an emergency message warning of severe weather conditions, can be provided substantially instantaneously, and to substantially only those households with a need for the information. For instance, a hurricane warning in southern Florida can be communicated only to those living in affected regions without disturbing on panicking those outside the affected regions. A traditional general radio or television broadcast warning is under-inclusive in some respects, and over-inclusive in other respects: Namely, such broadcasts only reach those who are watching television or listening to the radio (under-inclusive), but the broadcast area is typically much larger than the affected region (over-inclusive). If people outside the affected area are constantly exposed to warning messages that are not germane to them, there is a risk that they will be less sensitized to warnings generally, and may take less notice of a warning that does concern them directly.

Embodiments of this aspect of the invention can convert the message code from its telephone number format to a more usable form, such as a text display and/or an audible announcement. The conversion feature is advantageous in reducing the amount of data being sent, and reducing the burden on the sending entity to know what format and/or language will best deliver the message to the recipient. For example, a wake up call service could be implemented by identifying a particular message code corresponding to a "wake up" command. When this message code is received, it is converted into an audible alarm, and/or announcement, e.g., "wake up." In the context of emergency notification, a message code corresponding to a tornado warning could be converted into a text display of the words "Tornado Warning," and/or an alarm, and/or a verbal announcement.

In embodiments of this aspect of the invention that include audio announcement (e.g., through a speaker, and/or via the telephone handset), the equipment at the household-end can make those present immediately aware of the nature and/or content of the message, without the need to review or consult a display. This aspect of the invention does not require the subscriber to be within viewing distance of a display, nor does it require the subscriber to purchase and install units for each extension telephone. This aspect of the invention can serve all telephones on the premises as well as being used with cordless telephones and "speaker" phones.

Embodiments of this aspect of the invention can enable people with visual or literacy difficulties can receive information in a spoken verbal form. In addition, users can configure the equipment so that the display and/or announcement of messages or information are in their preferred language. Thus, embodiments of this aspect of the invention can provide enhanced accessibility to data messages to people with mobility, sight, literacy, language skill, or other challenges to receiving standardized text messages.

Embodiments of this aspect of the invention can also be provisioned with the ability for the user to customize or program the announcements to their own needs and purposes. For instance, the receiving equipment can be provided with the ability for the user to record an announcement corresponding to a received signal. The recorded announcement is stored in a database, and recalled and played back when that particular ICLID is received. When that ICLID signal is subsequently received, the receiving equipment plays back the prerecorded announcement.

In other embodiments, the identity of the caller is announced, e.g., in synthesized or prerecorded human speech. The Incoming Caller Line Identification (ICLID) signal sent by the telephone company is captured, and used to announce the calling party's identity, or other information, such as the geographic origin of the call to the called party through a built-in speaker and/or over the telephone receiver. It is thus possible to screen incoming telephone calls without the aid of a special Caller ID telephone set or auxiliary Caller ID display terminal. Receiving equipment is typically installed in the customer premises, such as a residence or office, between the telephone line demarcation point and the telephone sets. Connection to a telephone set is not required in order for the invention to function except to the extent that processes directly involves a telephone set (such as announcing information over the telephone handset). The equipment is compatible with any standard telephone set and subscriber trunks.

The receiving equipment is able to deliver a vocalized announcement of the caller's identity over a standard telephone set's receiver without the call having actually been declared answered by the telephone company, and without the caller having been cut through. The called party can elect to accept or reject the call before the telephone company central office has connected the two parties together. The call is not considered "answered" nor is it billed by the telephone company unless the called party or a telephone answering device, such as an answering machine, accepts the call.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

The details of one or more embodiments of the invention are set forth in the accompanying drawings and the description below. Other features, objects, and advantages of the invention will be apparent from the description and drawings, and from the claims.

DETAILED DESCRIPTION OF THE INVENTION

Figure 1:
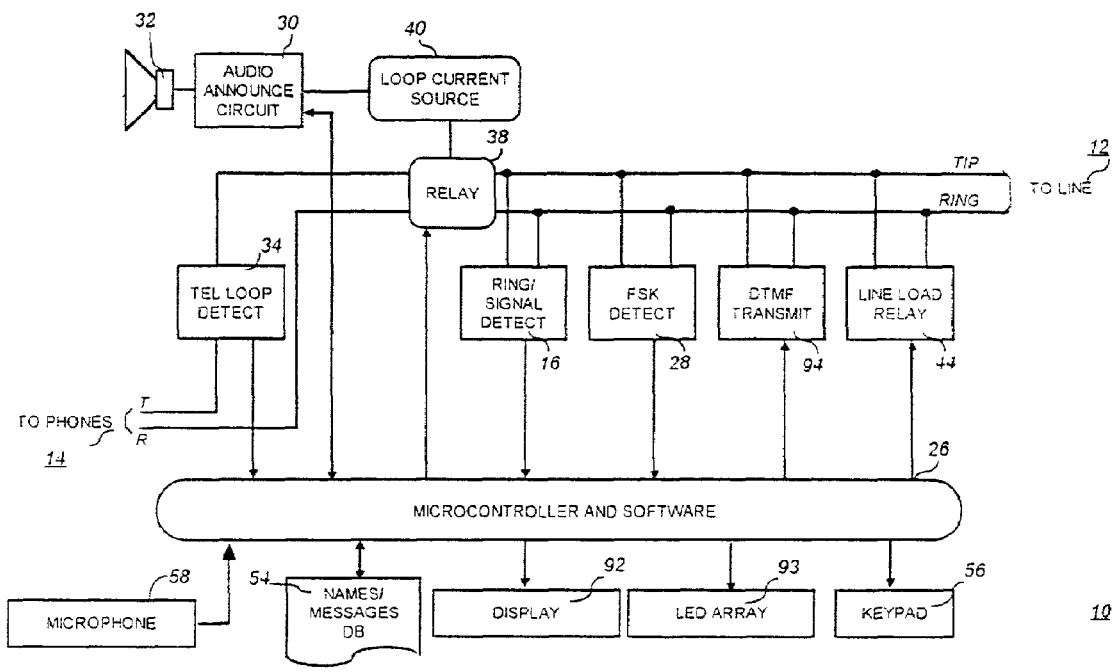
FIG. 1 illustrates a block diagram illustrating functional components of an embodiment of the invention.
Figure 1A:
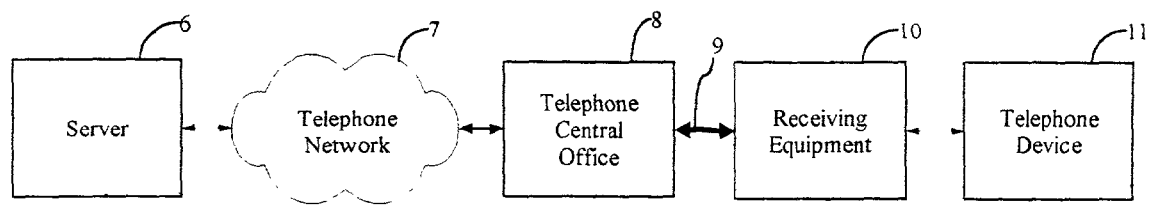
FIG. 1A is a block diagram of a messaging system for communicating over a telephone network.

A messaging system 4 is shown in FIG. 1A. This system includes a server 6 that transmits signals through the telephone network 7 to a telephone central office (or technological equivalent) 8 and then over a standard POTS telephone line 9 to be received by receiving equipment 10 located, e.g., at the customer premises. Optionally, one or more telephone set(s) 11 can be connected to receiving equipment 10.

The server 6 effects the transmission of signals in accordance with the format set forth in Bellcore GR-30-CORE, *Voiceband Data Transmission Requirements* "GR-30." This is an open standard that historically has been used for sending Caller ID (ICLID) information to telephone customers, an enhanced subscriber service offered by local telephone companies for a nominal monthly charge. No special provisions are necessary at the telephone company central office switching system other than for Bellcore-standard GR-30 message types, which is now provided by generic software packages from all major switching system manufacturers.

For the most typical use of Caller ID protocols, the ICLID information is associated with a particular telephone call, and is transmitted at the time of the call during the "quiet period" following the first ring, and is transmitted only to the customer premises equipment of the called party.

The server 6 can transmit signals representing notification information using the Caller ID system and the ICLID signal. Notification information is information other than Caller ID information, and can include community announcements, private communications, commercial messages, emergency notification messages, public safety notices, telephone network information and the like. The signals representing emergency notification messages can be derived from the standard US Emergency Alert System (EAS) codes.

To accomplish this, the server 6 is connected to the Signaling System 7 Network (SS7) that connects telephone central offices, and sets up a non-associated telephone call to the message recipient(s), through the Central Office(s) 8 of that message recipient(s).

Specifically, a block of, e.g., 100 telephone numbers is reserved for use as message codes. Each number serves as a message code corresponding to a specific message. For instance, in the emergency notification context, one number could correspond to a tornado warning (e.g., (555) 555-0001), and a different number could correspond to a hurricane warning (e.g., (555) 555-0002). A different number could correspond to a wake up message (e.g., (555) 555-0003).

To send a message, one or more message recipients, each of whom has a telephone number on the network, is first identified. For instance, if a hurricane warning is to be sent to everyone in the Florida Keys, the telephone numbers of each household in that region are identified. Then the system determines the telephone number message code corresponding to a hurricane warning, e.g., (555) 555-0002. For each of the identified recipient telephone numbers, the server sets up a non-associated telephone call. The ICLID signal for this non-associated telephone call includes data corresponding to the telephone number/message code corresponding to a hurricane warning, e.g., (555) 555-0002. This signal is received by each recipient, in the same manner as caller ID information. However, there is no actual call being placed from this telephone number, and thus no line is provisioned. If the recipient were to "answer" the call, no actual end-to-end telephone circuit would be established, and no call completion would take place. Thus, the non-associated call is a simulated call from a simulated calling party dialing from a telephone number that is identical to the message code. Only the called party (the message recipient) is real. This technique is particularly advantageous in that it puts minimal resource demands on the circuit-switched telephone network, and does not require expensive deployments of servers to each Central Office served. One server 6 can be located anywhere on the SS7 network.

The receiving equipment 10 is preprogrammed to recognize all of the e.g., 100, telephone number/message codes. When it does, rather than display the message code as a fictional incoming call telephone number, the equipment 10 refers to a local database to convert the information into a more usable form. For instance, rather than displaying the hurricane warning code, e.g., (555) 555-0002, as an incoming telephone call, the equipment could display the text "Hurricane Warning," and audibly announce that warning as well. Particular message codes could also trigger warning alarms. The same approach could be used with a single recipient to provide personalize wake-up call service, by sending the appropriate wake-up call message code/telephone number (e.g., (555) 555-0003).

Alternatively or additionally, the server 6 could transmit signals other than ICLID information, also using the GR-30-CORE standard. For instance, the server 6 can transmit signals that are or that represent notification information. For example, in the context of emergency notification, if the National Weather Service issues a tornado warning for a given region, the server 6 could be used to transmit the signal representing the characters "TOR" to the receiving equipment 10 in all homes in the region. A code transmitted within a properly formatted message by server 6 can also indicate the level of urgency of the message.

To accomplish this, the server 6 could be connected to an ordinary telephone line and configured to place an ordinary telephone call, which would prompt the telephone network to ring the recipient's telephone set 11. In the case where the recipient is a subscriber to Caller ID service, the Central Office 8 would deliver a GR-30 message containing caller ID information associated with the calling trunk used by the server over the telephone line 9. Once any telephone device (phone, answering machine, fax, etc.) "answers" the call, an end-to-end circuit is allocated by the telephone network connecting the server to the devices in the target household. At this time, the server can transmit and/or receive GR-30 or other data signals.

Alternatively, the server 6 could be located at the Central Office 8, and configured to instruct the equipment at the Central Office 8 to send a GR-30 message over telephone line 9 to the receiving equipment 10 at the recipient's premises without placing a call or making use of the SS7 network.

The receiving equipment 10 is typically installed in the customer premises, such as a residence or office, between the telephone service demarcation point and the telephone sets. The receiving equipment 10 is compatible with standard telephone sets, including cordless and speaker telephones. The receiving equipment 10 is also compatible with standard analog telephone subscriber trunks. The receiving equipment 10 is also compatible with the GR-30-CORE standard. The receiving equipment 10 decodes the received data signals according to applicable standards related to the message structure. In the case of Caller ID, the invention is compatible with Bellcore technical documents TR-TSY-00031, *Calling Number Delivery*, TR-TSY-01188, *Calling Name Delivery*, and TR-NWT-000575, *Call Waiting ID*. After decoding the received data signals, the receiving equipment 10 can convert the data into a more meaningful form for the user. For instance, in the case of Caller ID, the receiving equipment 10 converts the ICLID data to an audible signal representative of the caller's identity. This could be the caller's name, or phone number, or even the name of the caller's state (e.g., "New Hampshire"). The caller's identity is announced right away over a built-in speaker and/or the handset of an attached telephone, identifying the caller prior to answering a telephone.

In the case of an emergency notification, for instance, a tornado warning in the form of "TOR," the receiving equipment can convert that signal into a clear text message, e.g., "Tornado Warning!" and can also audibly announces the message. A code transmitted by the server 6 indicating a moderately urgent message would cause the receiving equipment 10 to issue a moderate indicator, such as a flashing light. A code indicating a highly urgent message would cause the receiving equipment 10 to issue a more attention-getting signal, such as an alarm bell and a flashing light. The receiving equipment can be configured by the user to display and announce messages in the user's preferred language. Thus, the server 6 can send the identical signal to every home, but the equipment in each home will convert that signal into each user's preferred language.

The receiving equipment 10 also supports the receipt of data signals that arrive while the subscriber's telephone set is engaged with another call. Many telephone users subscribe to a service called "Call Waiting" for handling incoming telephone calls while the subscriber's telephone set is busy or engaged. In the case of ICLID signals on telephone lines provisioned with "Caller ID with Call Waiting" service, the receiving equipment 10 detects the Caller ID information following the Call Waiting alerting tone, and identifies the waiting call by announcing the waiting caller's identity over the engaged telephone. Notification information received by the receiving equipment 10 while the subscriber is engaged with a call is likewise displayed and announced. Only the called party hears this announcement.

The receiving equipment 10 is able to deliver messages without requiring the recipient to "pick up" or "answer" the telephone. A circuit-switch connection from the message sender (or calling party) to the recipient is not required in order for the device to receive, interpret, and present messages or information.

The power ringing signal is provided directly by the telephone company central office. The receiving equipment 10 does not block or regenerate the ring signal. This attribute is particularly important for subscribers of other custom calling services, such as "distinctive ringing". The receiving equipment 10 detects a telephone off-hook condition and isolates the telephone from the telephone company central office without interfering with ringing. Data signals may be preceded by a ring signal and/or other signals such as an FSK carrier signal commonly used to indicate the start of data transmission.

FIG. 1 illustrates a block diagram of the receiving equipment 10. Equipment 10 is connected to the POTS telephone network at connection point 12, typically an RJ-11 "modular" telephone jack common to most telephones. All telephone sets served by the invention are connected at point 14, also typically an RJ-11 jack. While in the idle or power-down state, double pole double throw relay 38 is in the position that connects the Tip and Ring leads at point 12 to the Tip and Ring leads at point 14. While the unit is under power, the state of relay 38 is under microcontroller 26 software control. Microcontroller 26 is a general purpose programmable embedded microcontroller such as an Intel 8051 and includes the software stored in ROM. Microcontroller 26 has links to telephone loop detector 34, ring detector 16, FSK decoder 28, DTMF transmitter 94, microphone 58, keypad 56, relay 38, pre-loading circuit 44, announcement circuit 30, LCD display 92, LED array 93, and database 54. Database 54 contains audio records keyed to ICLID numbers and any other message type relevant for the specifically programmed purposes of the device. Database 54 may also contain alert protocols (sequence and timing) and/or specific text, and display element (e.g., LED) protocols associated with specific caller ID or other message data. Database 54 may also be used to store call and message history information. Database 54 is stored in non-volatile RAM or "Flash" memory accessed by microcontroller 26.

With respect to Caller ID message types, the telephone central office 8 alerts the device to an incoming call by applying either a ring voltage to Tip and Ring leads at point 12, or transmitting an alerting tone used for Call Waiting. Ring/signal detector 16 detects the ring voltage and alerting tone as it is applied by the telephone central office and indicates such to microcontroller 26. In the preferred embodiment, Ring/signal Detector 16 consists of a Siemens model H11AA1 optoisolator for detecting bi-phase power ringing, and a MITEL model MT8843 call waiting detector for detecting the new call alerting tone.

In response to a non-associated or actual telephone call conducted by server 6, the central office 8 alerts the device to an incoming call by using one or more techniques including ring voltage, abbreviated ring voltage "ping ring", Open Switching Interval, or alerting tone.

FSK Decoder 28 detects frequency shift keyed (FSK) signals present at the Tip and Ring leads at point 12 (connected to the telephone central office). The FSK data contains the ICLID information or other data transmitted from the messaging server 6 at the telephone central office. The FSK data from the output of decoder 28 is presented to microcontroller 26. MITEL's MT8843 is preferably used as decoder 28.

Keypad 56 is provided for the user interface. In the preferred embodiment, keypad 56 is a series of four tactile keys used for selecting programming modes, recording audio to corresponding Caller ID records, and reviewing calls or other messages stored in a call log.

LCD Display 92 and Light Emitting Diode (LED) array 93 are used to provide information to the user including the nature and content of caller ID and other messages types; and cues to certain operations of the invention, including alert status related to public safety messages, error conditions of the device, and the status of incoming or new calls.

Microphone 58 is used for receiving audio signals to be stored by the microcontroller and associated with corresponding caller ID records or other message types. In the preferred embodiment, microphone 58 is an electret microphone.

DTMF transmitter 94 transmits Dual Tone Multiple Frequency (DTMF) signals onto the Tip and Ring leads at point 12 (connected to the telephone central office). The DTMF signal transmitted from the analog output of transmitter 94 is controlled by microcontroller 26, and is used for interacting with telephone company central office switching system protocols used during Caller ID on Call Waiting and other messaging protocols. Mitel's model MT-8888 is preferably used as transmitter 94.

Loop detector 34 detects the presence of loop current through the telephone sets. The output of detector 34 is presented to microcontroller 26. Siemens model H11AA1 is preferably used for loop detector 34.

Announcement circuit 30 supplies a small signal announcement into current source 40. Announcement circuit 30 is controlled by microcontroller 26. Announcement circuit 30 is factory-programmed with static prompts representing the numbers 0-9, phrases "number unknown" and "number blocked", as well as the names of the fifty US States and other voice alerts and/or prompts related to a message type served by the system. Each of these announcements, as well as announcements to be recorded by the user, can be individually addressed by microcontroller 26. Information Storage Devices' model ISD2575 is preferably used along with an audio amplifier LM386 for announcement circuit 30. Advances in speech storage and compression techniques make it possible to integrate "off-the-shelf" speech devices to provide the audible announcement of the caller's identity or other relevant message content. It is not the object of the invention to promote a special speech technology, but rather to be able to take advantage of such generic technology, including text-to-speech technology, as it becomes available.

Current source 40 amplifies the audio signal for playing the caller's identity or other announcements into relay 38 for announcement over the telephone set(s) 11 attached at point 14 and/or speaker 32. Current source 40 is preferably a current source LM317 biased to provide a nominal 28 mA of current through an off-hook telephone set attached at point 14.

Loading circuit 44 is used to hold the primary call stable while call waiting calls are audibly identified over telephone sets attached at point 14. A high voltage transistor such as MPSA42 is used to selectively engage the line at point 12 by sinking 28 mA from the telephone line.

Figure 2:
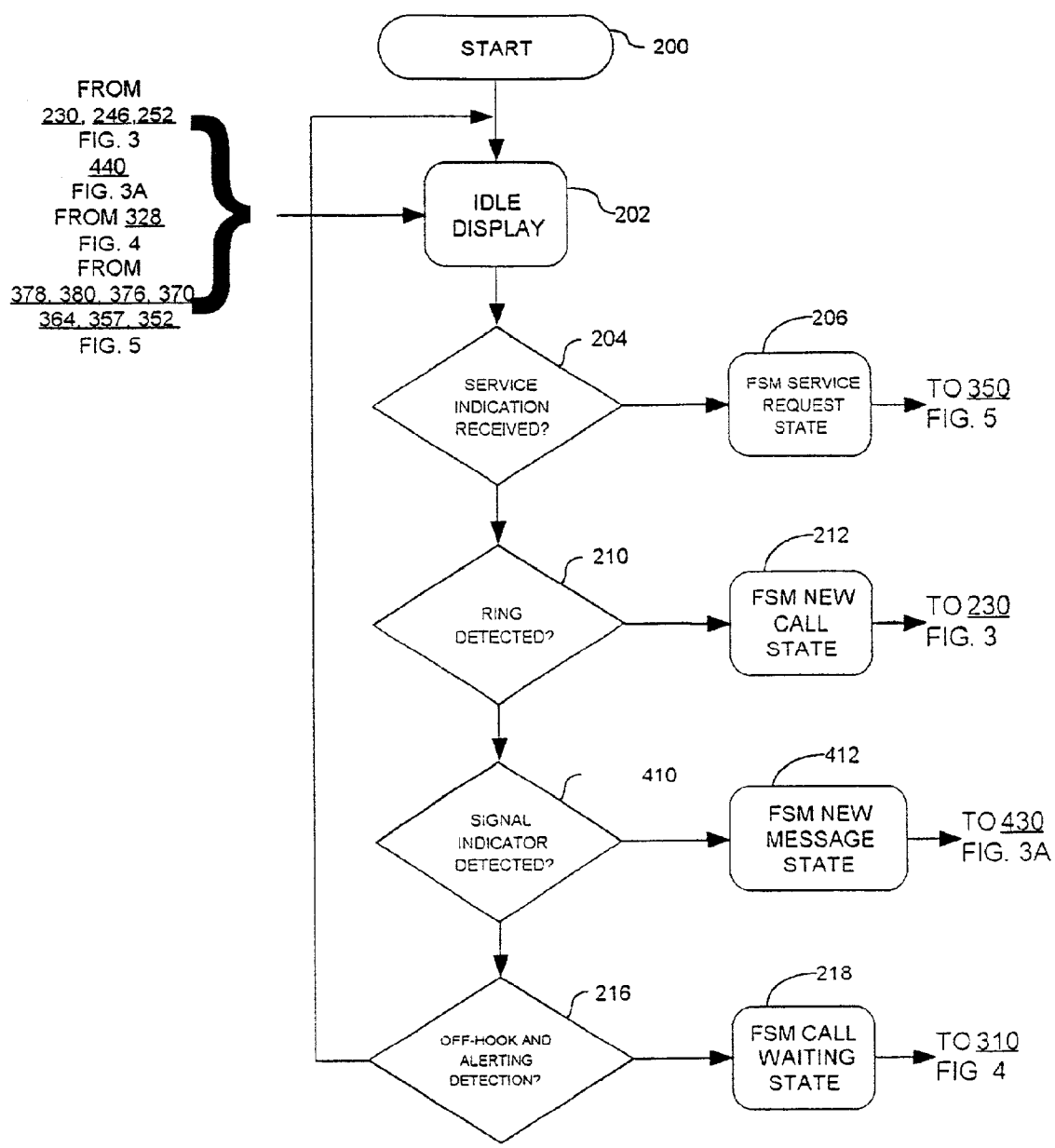
FIG. 2 is a flow chart showing the microcontroller processing software in the MAIN routine.

FIG. 2 illustrates the main software process executed by microcontroller 26. A Finite State Machine (FSM) process is used to control the invention. The primary states of the FSM are STARTUP, SERVICE, NEW CALL, NEW MESSAGE, and CALL WAITING states.

Process 200 is a startup routine for the selected microcontroller 26 used to set up interrupt vectors, serial modes, and hardware configuration. Process 200 is entered following power-up or reset of the invention and sets the FSM to the STARTUP state. Execution continues to process 202. Relays 38 and 44 are de-energized. Dynamic call records are initialized and elements about the last call are preserved. The number of calls or messages stored in a call log, along with the local time and date, is displayed on an attached LCD display 92.

Process 204 monitors the status of keypad 56. When a service request is made by the user by pressing any of the keys, execution branches to process 206 where the FSM transitions to SERVICE state and branches to process 350. Otherwise execution continues at process 210. Process 210 checks the result of polling ring/signal detector 16 for a new call or new message indication. A new call is indicated when detector 16 detects a power ring signal, whereby execution branches to process 212 where the FSM transitions to the NEW CALL state and branches to process 230. A NEW MESSAGE is indicated when detector 16 detects a 'ping ring' signal, open switching interval, alert tone, or presence of an FSK carrier signal commonly used to indicate the start of data transmission whereby execution branches to process 412 where the FSM transitions to the NEW MESSAGE state and branches to process 430 (FIG. 3A). Otherwise, execution continues at process 216. Process 216 checks the result of polling detector 16 for a call waiting indication. A call waiting is indicated when detector 16 detects an alerting tone, whereby execution branches to process 218 where the FSM transitions to the CALL WAITING state and branches to process 300. Otherwise, execution loops back to process 202.

Figure 3:
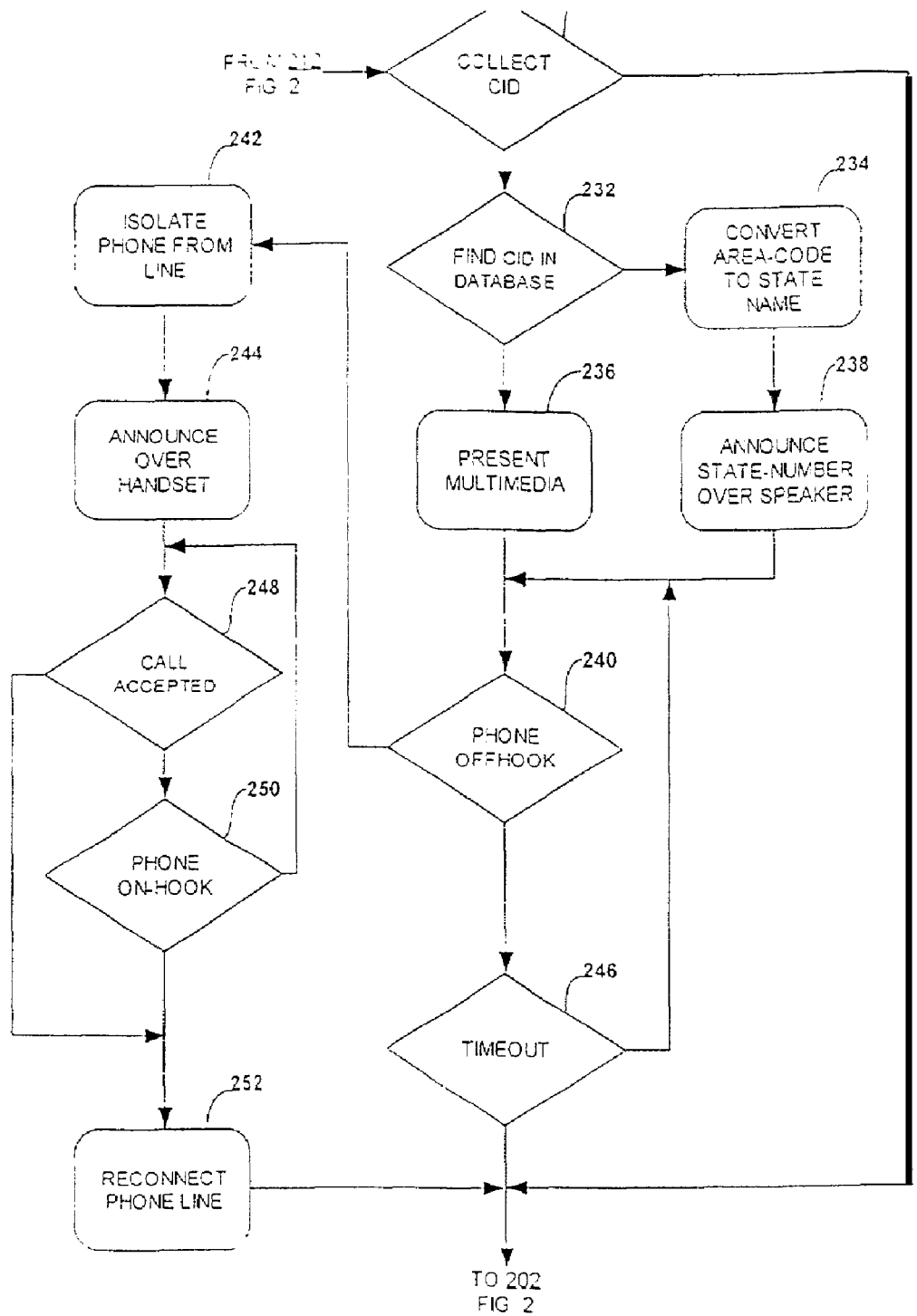
FIG. 3 is a flow chart showing the microcontroller processing software for handling NEW CALL calls.
Figure 3A:
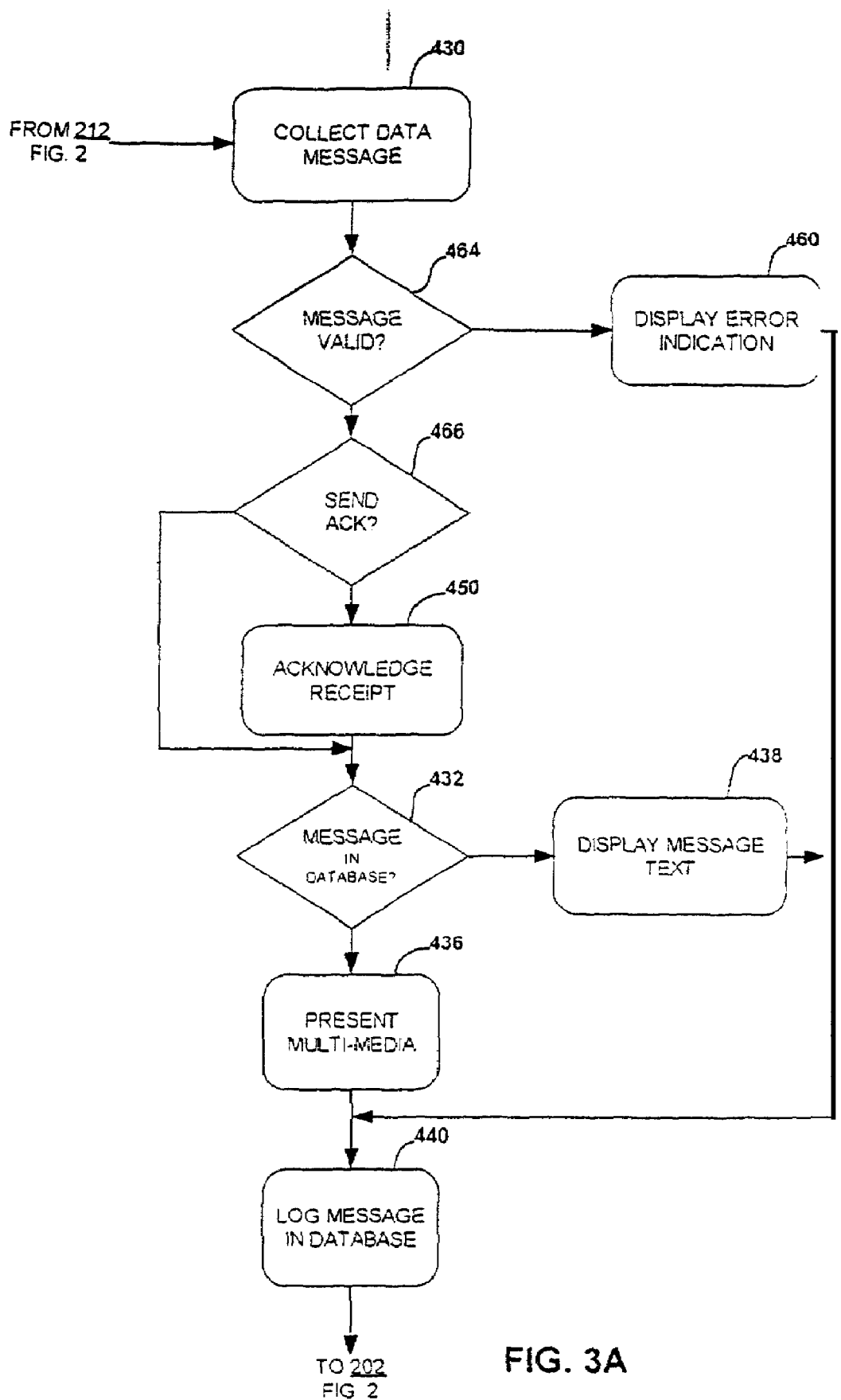
FIG. 3A is a flow chart showing the microcontroller processing software for handling NOTIFICATION MESSAGES.

FIG. 3 illustrates the NEW CALL state process. The process begins at 230 where the ICLID signal is collected by FSK detector 28 and the data sent to microcontroller 26 for storage in the call log of database 54. Process 232 searches database 54 for a match to the collected ICLID number. Database 54 contains audio information keyed with an ICLID number or a group of ICLID numbers. If the ICLID data is not provided by the telephone company or the ICLID number is blocked by the calling party, microcontroller 26 identifies the calls as "number unknown" or "number blocked" respectively. Process 232 branches based on the status of the search through database 54. If the search returned a zero value, execution branches to process 234, where the area-code from the ICLID number is cross-referenced with the name of a state and at process 238 microcontroller 26 directs announcement circuit 30 to speak the name of the state and the ICLID number, typically the caller's telephone number. If the database 54 search was successful, execution branches to process 236 and microcontroller 26 directs announcement circuit 30 to present the associated audio (alert tones and/or words) returned from the search. Process 236 further directs display 92 and LED array 93 to display corresponding text, symbols and lights. Process 240 checks the state of loop detector 34 for an off-hook condition. If an off-hook condition is detected before process 246 determines a timeout, processing jumps to 242. If a timeout is detected, processing jumps back to 202. Process 242 isolates the off-hook phone from the line by engaging relay 38 and applying loop current 40. Process 244 causes circuit 30 to announce the caller's identity or other message contents over the off-hook telephone set. Processes 248 and 250 look for the call to be accepted with a hook-flash or rejected with a hang-up by checking loop detector 34 before disengaging relay 38 and re-establishing connection to the line at process 252. Finally, control is returned back to process 202

FIG. 3A illustrates the NEW MESSAGE state process. The process begins at 430 where the data signal is collected by FSK detector 28 and the data sent to microcontroller 26.

Process 464 validates the integrity of message and branches upon determination of the state of validity. Where the message has been determined to be invalid, the process branches to 460 where microcontroller 26 commands the LCD to display "error", and then continues to process 440 to store the message in the message log.

Where the message has been determined to be valid, process 466 examines the message type to determine whether or if a message acknowledgement signal is validly requested. Where the message acknowledgement has been validly requested, process 450 commands line load relay 44 to engage the line (go off-hook) for a predetermined amount of time and/or commands the functions of DTMF Transmit circuit 94 in conformance with the applicable message acknowledgement standard. Where message acknowledgement has not been validly requested, process 450 will be bypassed. In either case, the FSM continues to process 432

Process 432 searches database 54 for a match to the collected message contents. Database 54 contains audio and other multi-media information (such as LED lighting sequence and duration) keyed with message content.

Process 432 branches based on the status of the search through database 54. If the search returned a zero value, execution branches to process 438, where the text content of the message is displayed on LCD Display 92. If the database 54 search was successful, execution branches to process 436 and microcontroller 26 directs announcement circuit 30 to present the sequence of tones and spoken audio information returned from the search and directs LCD 92 and LED Array 93 to display and illuminate in the manner specified in database 54.

Figure 4:
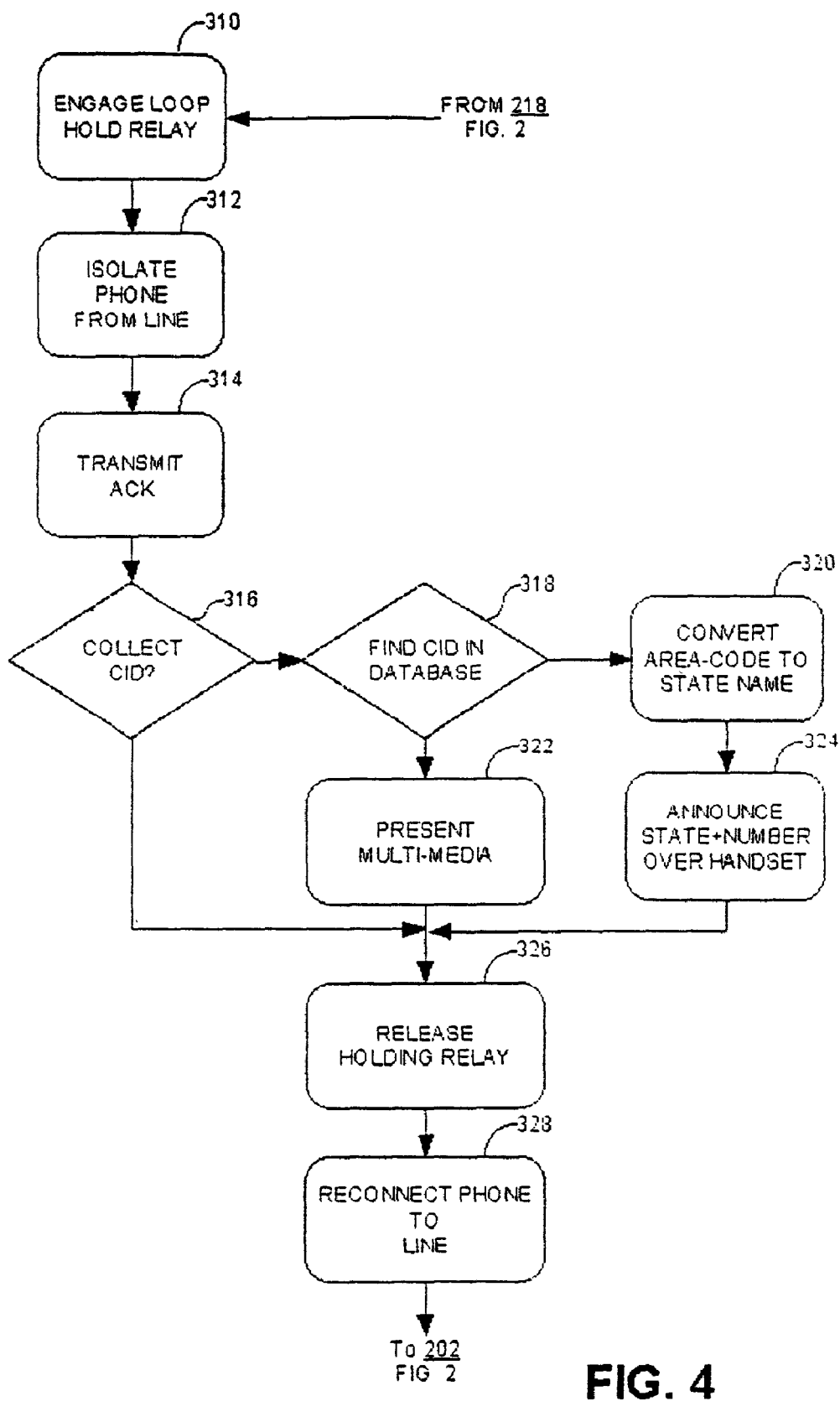
FIG. 4 is a flow chart showing the microcontroller processing software for handling CALL WAITING calls.

Process 440 stores the message contents, date and time information in database 54. Finally, control is returned back to process 202. FIG. 4 illustrates the CALL WAITING state process. The process begins at 300 after detecting the alerting tone, by engaging load relay 44 to hold the line off-hook at process 310 and then engaging isolation relay 38 in process 312. In process 314, an ACK tone (typically DTMF-D) is transmitted back down the line towards the telephone company switch to indicate that the device is ready to receive ICLID data. In process 316, ICLID signal is collected by FSK detector 28 and the data sent to microcontroller 26 for storage in the call log of database 54. Process 318 searches database 54 for a match to the collected ICLID number. Database 54 contains audio information keyed with an ICLID number or a group of ICLID numbers. If the ICLID data is not provided by the telephone company or the ICLID number is blocked by the calling party, microcontroller 26 identifies the calls as "number unknown" or "number blocked" respectively. Process 318 branches based on the status of the search through database 54. If the search returned a zero value, execution branches to process 320, where the area-code from the ICLID number is cross-referenced with the name of a state and at process 324 microcontroller 26 directs announcement circuit 30 to speak the name of the state and the ICLID number, typically the caller's telephone number. If the database 54 search was successful, execution branches to process 322 and microcontroller 26 directs announcement circuit 30 to play the audio returned from the search over the off-hook telephone. Process 322 further directs display 92 and LED array 93 to display corresponding text, symbols and lights. Process 326 releases loading relay 44 after the announcement concludes. Processes 328 disengages relay 38 and re-establishes conversation with the primary caller. Finally, control is returned back to process 202

Figure 5:
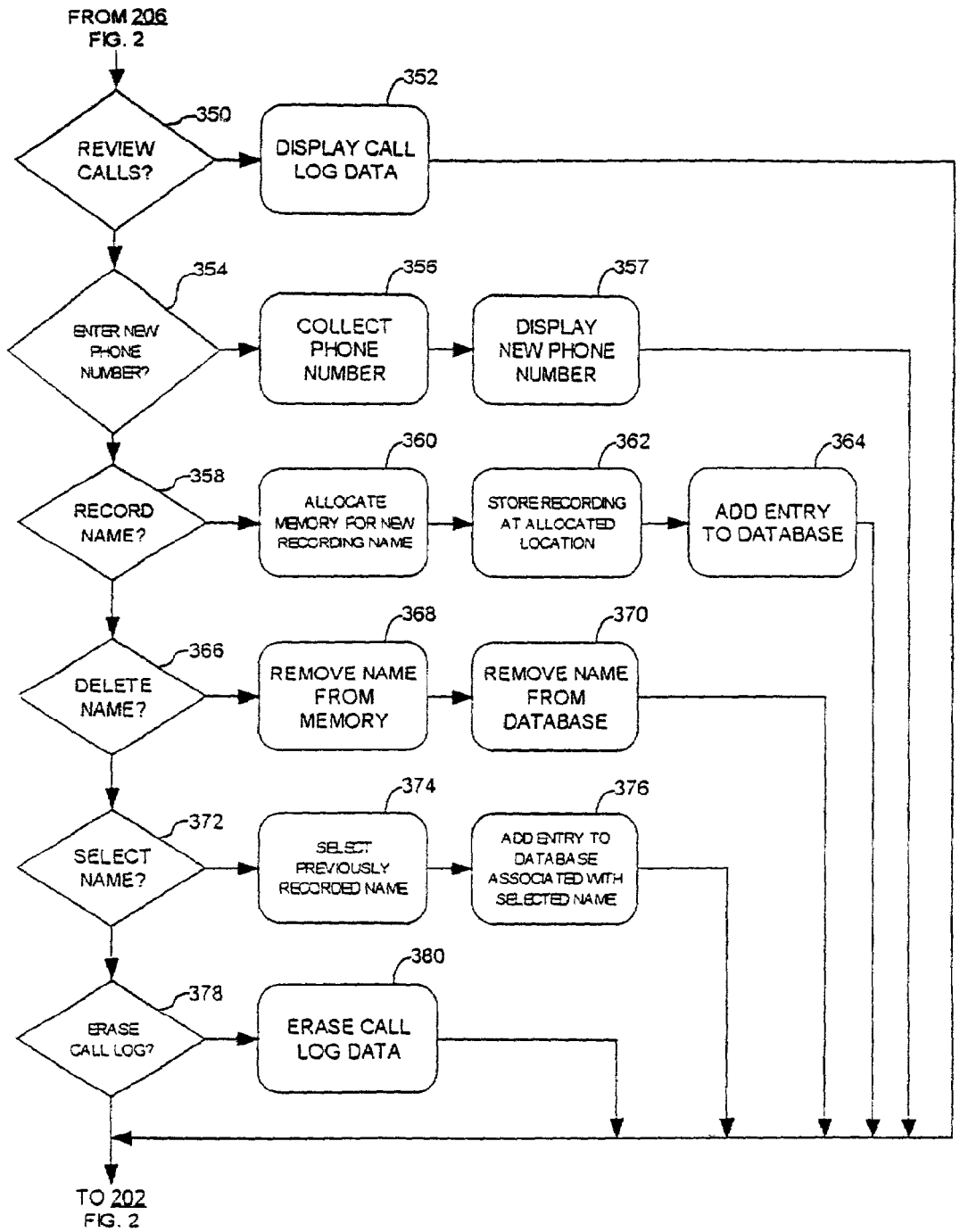
FIG. 5 is a flow chart showing the microcontroller processing software for SERVICE, such as adding a caller to the name database.

FIG. 5 illustrates the SERVICE state processes. The SERVICE processes are used to add audio announcements to the database, erase audio announcements, select previously recorded announcements to be associated with a new telephone number, review the call log, erase the call log, and to manually enter a telephone number for further recording.

Process 350 checks keypad 56 for review call/message log requests. Execution jumps to process 352 to review calls in the log by recalling call log information from database 54 and displaying the call/message log information on display 92. Execution then returns to process 202.

Process 354 checks keypad 56 for manual entry requests. Execution jumps to process 356 where the phone number is collected using keypad 56. At process 357, the entered number is displayed on display 92. Execution then returns to process 202.

Process 358 checks keypad 56 for record name requests. Execution jumps to process 360 where microcontroller 26 allocates memory in database 54 for storing an audio recording to be associated with the presently displayed ICLID information. Process 362 enables microphone 58 to receive the audio signal and record the audio signal in the allocated memory. An equivalent process to associate and/or replace audio records related to non-ICLID messages may also be enabled for certain message types. Process 364 then adds a record to database 54 that keys the displayed ICLID information with the address of the newly recorded audio. Execution then returns to process 202.

Process 366 checks keypad 56 for delete name requests. Execution jumps to process 368 where microcontroller 26 searches database 54 for stored audio associated with the presently displayed ICLID information. Process 370 erases the database reference to the displayed ICLID information. Execution then returns to process 202.

Process 372 checks keypad 56 for select name requests. Execution jumps to process 374 where the user selects from previously recorded audio to be associated with the presently displayed ICLID information. Process 376 directs microcontroller 26 to add a database record associating the displayed ICLID information with the selected audio recording. This processing enables multiple telephone numbers to be associated with the same audio recording. Execution then returns to process 202.

Process 378 checks keypad 56 for erase call/message log requests. Execution jumps to process 380 where microcontroller 26 clears the call log data stored in database 54 and the call log counter is set to zero. Execution then returns to process 202.

In operation, when an ICLID signal is received with an incoming call, the receiving equipment 10 does either or both of two things. The receiving equipment 10 announces the caller's name, telephone number, and/or other identifying information through speaker 32. Additionally or alternatively, the recipient can pick up a telephone handset to hear the Caller ID information announced, before the call is actually connected. The telephone company central office is unaware that the telephone was answered and continues to return the ringback indication to the calling party and ring voltage to the subscriber's service demarcation point.

In operation, when an ICLID signal is received that is associated with a non-call message type, or a non-ICLID GR-30 message set is received (for example, a hurricane warning) the receiving equipment 10 announces and/or displays the content of the interpreted message per the instructions stored in database 54. This may involve sending audible signals to either or both of the speaker 32 and the handset of an attached off-hook telephone 11.

The telephone company central office is prevented from detecting the "off-hook" condition by isolating the telephone sets from the telephone company central office at precisely the moment the telephone set is engaged. In one embodiment, this is accomplished by energizing the relay 38 to break the connection to the central office after the telephone is answered but before the central office has detected the off-hook condition. The receiving equipment 10 can alternatively take advantage of common provisions, such as the radio frequency (RF) interface in cordless telephones, that physically isolate the remote handset from the telephone network not otherwise intended for purposes of audible off-hook Caller-ID delivery. While the off-hook telephone is isolated from the telephone company central office, the telephone is connected to the loop current source 40, which powers the off-hook telephone set while providing the audible announcement over the receiver.

The called party can elect to accept the call by flashing the telephone's hook switch or touching a specific key on the telephone keypad. Once the call is accepted, the caller and called parties are connected and normal telephone operation is restored.

The called party can reject the incoming call by hanging up the telephone. If the call is rejected, and the caller continues to wait for an answer, ringing is restored, but the Caller ID is not announced again. This provides an opportunity for telephone answering devices to accept the call. It also gives the called party another chance to accept the call.

Thus, the receiving equipment 10 is able to deliver an audible announcement of the caller's identity over a telephone without the call being "answered". The call is not connected nor is it billed by the telephone company until the called party or a telephone answering device, such as an answering machine, accepts the call.

Other embodiments are within the scope of the following claims.

The invention claimed is:

1. A data communication method for use in a telephone network having a caller-identification feature, wherein the caller-identification feature communicates data to a called party that includes data corresponding to a telephone number of a calling party, the method comprising:
   identifying a message recipient having a message recipient telephone number on the telephone network;
   selecting a message for the message recipient;
   providing a message code corresponding to the selected message, wherein the message code is in the format of a telephone number;
   setting up a non-associated telephone call to the recipient telephone number from a simulated calling party having the same telephone number as the message code, such that the telephone network uses the caller-identification feature to communicate data corresponding to the message code to the recipient telephone number;
   receiving the data corresponding to the message code at the recipient telephone number.

2. The method of claim 1 further comprising the step of converting the received data corresponding to the message code.

3. The method of claim 2 wherein the received data corresponding to the message code is converted to the message for the message recipient.

4. The method of claim 3 further comprising the step of displaying the message as text.

5. The method of claim 3 further comprising the step of audibly announcing the message.

6. The method of claim 5 wherein the message is audibly announced over a speaker other than a speaker in a telephone handset.

7. The method of claim 5 wherein the message is audibly announced over a speaker in a telephone handset.

8. The method of claim 7 wherein the telephone handset is corded.

9. The method of claim 7 wherein the telephone handset is cordless.

10. The method of claim 1 wherein the telephone network is the North American telephone network.

11. The method of claim 10 wherein the caller-identification feature is Caller ID.

12. The method of claim 11 wherein the data communicated to a called party by the Caller ID feature is the Incoming Caller Line Identification (ICLID) signal.

13. The method of claim 10 wherein the format of the telephone number includes a three-digit area code and a seven-digit number.

14. The method of claim 10 wherein the message code is a ten-digit number.

15. The method of claim 1 wherein the caller-identification feature communicates data on a common channel interoffice signaling system.

16. The method of claim 15 wherein the caller-identification feature communicates data on the signaling system 7 (SS7) common channel interoffice signaling system.

17. The method of claim 1 further comprising the step of identifying plural message recipients, each having a respective message recipient telephone number.

18. The method of claim 17 wherein the recipients are identified on the basis of geographical location.

19. The method of claim 17 wherein the same message is selected for each of the plural recipients.

20. The method of claim 19 wherein the message is an emergency notification message.

21. The method of claim 1 further comprising the step of causing a telephone associated with the message recipient telephone number to provide a distinctive ring when data corresponding to a message code is received at the recipient telephone number.

22. The method of claim 1 wherein the message is an emergency notification message.

* * * * *

UNITED STATES PATENT AND TRADEMARK OFFICE
CERTIFICATE OF CORRECTION

PATENT NO. : 7,418,087 B2  Page 1 of 1
APPLICATION NO. : 10/038866
DATED : August 26, 2008
INVENTOR(S) : David J. Luneau It is certified that error appears in the above-identified patent and that said Letters Patent is hereby corrected as shown below:

<u>Cover Page</u>:

Item (57): correct Abstract as follows:

First page, Column 2, Line 10 -- After "can be" delete the second occurrence of "can be"

Signed and Sealed this

Sixteenth Day of December, 2008

JON W. DUDAS
*Director of the United States Patent and Trademark Office*